United States Patent [19]

Barcza

[11] 3,853,994

[45] Dec. 10, 1974

[54] DIPHENYL(3-DI ALKYLAMINOPROPYL)SILANES AS THERAPEUTICS

[75] Inventor: Sandor Barcza, West Orange, N.J.

[73] Assignee: Sandoz-Wander, Inc., Hanover, N.J.

[22] Filed: June 18, 1973

[21] Appl. No.: 370,690

Related U.S. Application Data

[60] Division of Ser. No. 206,509, Dec. 9, 1971, abandoned, which is a continuation-in-part of Ser. No. 881,324, Dec. 1, 1969, abandoned.

[52] U.S. Cl.... 424/184, 260/448.2 N, 260/448.2 Q, 260/448.2 R
[51] Int. Cl............................................ A61u 27/00
[58] Field of Search............ 260/448.2 N, 448.2 Q, 448.8 R; 424/184

[56] References Cited

UNITED STATES PATENTS

| | | | |
|---|---|---|---|
| 2,943,103 | 6/1960 | Jex et al. | 260/448.8 R |
| 2,955,127 | 10/1960 | Pike | 260/448.2 N |
| 3,504,007 | 3/1970 | Owen et al. | 260/448.2 N |

*Primary Examiner*—Stanley J. Friedman
*Attorney, Agent, or Firm*—Gerald D. Sharkin; Richard E. Villa; Joseph J. Borovian

[57] ABSTRACT

Diphenyl(3-dialkylaminopropyl)-silanes, e.g., vinyldiphenyl-(3-dimethylaminopropyl)-silane, are prepared by reacting a Grignard reagent, e.g., 3-dimethylaminopropylmagnesium chloride, with a diphenylchlorosilane. The resulting compounds are useful as hypotensive/antihypertensive agents, tranquilizing agents, and diuretic agents.

17 Claims, No Drawings

DIPHENYL(3-DIALKYLAMINOPROPYL)SILANES AS THERAPEUTICS

This is a division of Ser. No. 206,509, filed Dec. 9, 1971, which, in turn, is a continuation-in-part of Ser. No. 881,324, filed Dec. 1, 1969 and both are now abandoned.

This application relates to novel silane derivatives which are useful as hypotensive agents. In particular, it relates to silanes having 1 or 2 3-dialkylaminopropyl substituents, and at least 2 phenyl substituents, their acid addition and quaternary ammonium salts, and to pharmaceutical compositions and methods utilizing the pharmacological activity of said compounds.

The compounds of this invention may be represented by the formula:

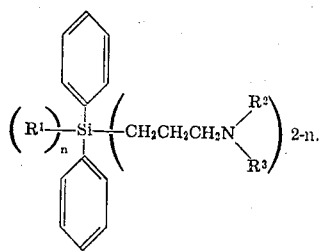

I where
$n$ is 0 or 1,
each $R^1$ represents alkyl having 1 to 4 carbon atoms, e.g., methyl, ethyl, isopropyl, etc.; alkoxy having 1 to 4 carbon atoms, e.g., methoxy, ethoxy, etc.; alkenyl having 2 or 4 carbon atoms, e.g., vinyl, allyl or methallyl; or phenyl, and
$R^2$ and $R^3$ independently, represent alkyl having 1 to 4 carbon atoms or their pharmaceutically acceptable acid addition or quaternary ammonium salts.

The process for preparing the compounds of this invention is illustrated by the following reaction scheme:

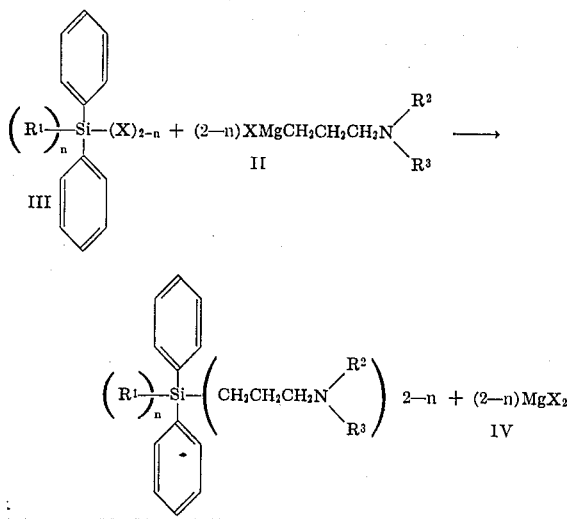

where each X represents independently, a halogen having an atomic weight of about 35 to 127, e.g., chlorine or iodine, and $R^1$, $R^2$ and $R^3$ are as defined above.

The product I is formed by treating the halosilane III with the Grignard reagent II. The reaction is carried out in the type of solvent in which Grignard reagents are prepared. Normally, this would be an ether, preferably diethyl ether, dioxane or tetrahydrofuran, and especially diethyl ether or tetrahydrofuran. Although the temperature of the reaction is not critical, it is preferred that the process be carried out between room temperature and the reflux temperature of the reactants, preferably between about room temperature and about 100°C. and especially between about 30°C. and about 70°C. The final product is isolated by conventional techniques, e.g., distillation.

The Grignard reagent II is prepared in the conventional manner. In the process of this invention, it is not necessary for the Grignard reaction to be completed before the halosilane (III) is addded. The halosilane can be added before, during or after the Grignard reagent is formed.

The preferred process involves the addition of magnesium to the ether solvent and then priming with methyl iodide. The dialkylaminopropyyl halide is added dropwise at a rate which maintains gentle refluxing of the reactants. When the addition is complete, the halosilane is then added dropwise at a rate which continues the gentle refluxing action. When the second addition is complete, the refluxing is continued preferably for another 1 to 4 hours. For optimum results an additional reaction period of several hours to a few days is desirable.

The present invention also includes quaternary ammonium salts of the compounds of formula I, preferably the lower alkyl quaternary ammonium halides. The preferred salts are prepared from the lower alkyl halides, i.e. alkyl halides in which the lower alkyl portion has 1 to 4 carbon atoms and the halide portion is a halide having an atomic weight of about 35 to 127, e.g., methyl chloride, methyl iodide, ethyl chloride and the like. Such salts are prepared by conventional techniques, e.g., by reacting the lower alkyl halides or di-lower alkyl sulfates with a compound of formula (I) preferably in a solvent such as ethers or alcohols. The salts are isolated using conventional techniques, e.g., precipitation and recrystallization.

The pharmaceutically acceptable acid addition salts of the compounds of the formula I can also be prepared from the free base by conventional procedures. Many of the 3-dialkylaminopropyl halides used in preparing the Grignard reagent of formula (II) and the silanes of formula (III) are known and are prepared by methods described in the literature. The 3-dialkylaminopropyl-halides and the silanes not specifically described in the literature may be prepared from available materials by analogous methods.

The silanes represented by formula (I) and their acid addition and quaternary ammonium salts are useful because they possess pharmacological activity in animals.

In particular, these compounds are useful as mild tranquilizers as indicated by their activity at 20–100 mg./kg. i.p. in mice by use of both (1) a 30-word adjective check sheet method and noting their behavior using the method basically as described by S. Irwin, (Gordon Research Conference, Medicinal Chemistry, 1959) and Chen (Symposium on Sedative and Hypnotic Drugs, Williams and Wilkins, 1954), and (2) a method concerning antagonism of amphetamine induced stimulation using 2.5 mg./kg. i.p. of amphetamine sulfate and noting the effect of the test compound on locomotor activity by use of an actophotometer. They are also useful as anti-hypertensives/hypotensives as indicated by their activity in anesthetized dogs given 10 mg./kg. i.v. of active compound and tested by blood pressure measurement using a mercury manometer or transducer via a catheter inserted in the carotid or femoral artery.

Moreover, the vinyldiphenyl-(3-dialkylaminopropyl)silanes are especially useful as diuretics as indicated by their activity in the rat orally given 25 mg./kg. to 50 mg./kg. of animal body weight of active material. The test method used is basically as described by Roy Asten, Toxicol. and Appl. Pharmacol, 1, 277, 1959.

For such uses, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered as a tranquilizer, at a daily dosage of from 5 milligrams to about 200 milligrams per kilogram of body weight and as an antihypertensive, hypotensive or diuretic at a daily dosage of from about 1 milligram to about 200 milligrams per kilogram. Preferably, the compounds are given in divided doses 2 to 4 times a day, or in sustained release form. For most mammals the administration of from about 300 milligrams to about 3,000 milligrams of the compound per day provides satisfactory tranquilizing results, while about 75 to 1,500 milligrams per day provides satisfactory anti-hypertensive, hypotensive and diuretic results. Dosage forms suitable for internal administration comprises from about 75 milligrams to about 1,500 milligrams of the compound as a tranquilizer and about 20 to about 750 milligrams of the compound as an antihypertensive hypotensive or diuretic agent, in admixture with a solid or liquid pharmaceutical carrier or diluent.

For the above usage, oral administration with carriers may take place in such conventional forms as tablets, dispersible powders, granules, capsules, syrups and elixirs. Such compositions may be prepared according to any method known in the art for manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservative (ethyl-p-hydroxybenzoate). Capsules preferably contain the active ingredient admixed with an inert solid diluent, e.g. calcium carbonate, calcium phosphate and kaolin. The preferred pharmaceutical compositions from the standpoint of preparation and ease of administration are solid compositions, particularly solid diluent-filled capsules and tablets.

The preferred compounds of formula I are those which contain only two phenyl groups.

Representative formulations of a tablet and a capsule prepared by conventional techniques are as follows:

| Ingredient | Weight (mg.) | |
|---|---|---|
| | Tablet | Capsule |
| Vinyldiphenyl-(3-dimethylaminopropyl)silane | 75 | 75 |
| Tragacanth | 10 | |
| Lactose | 172.5 | 225 |
| Corn Starch | 25 | |
| Talcum | 15 | |
| Magnesium Stearate | 2.5 | |

EXAMPLE 1

(3-dimethylaminopropyl)-silanes

The Grignard reagent, 3-dimethylaminopropyl magnesium chloride, is prepared under nitrogen by adding 24 g. (1 mole) of magnesium turnings to 200 milliliters of absolute tetrahydrofuran and priming it with 0.1 milliliters of methyl iodide. To this mixture, about 90 g. of fresh 3-dimethylaminopropyl chloride is added dropwise at a rate which produced gentle refluxing due to the reaction.

When addition of the amine is complete, 50.6 g. (0.2 mole) of diphenyl-di-chlorosilane is added dropwise at a rate which maintains the gentle refluxing.

The mixture is refluxed for 4 hours and stirred at 25°C. overnight. The solids which separate are filtered off and washed with tetrahydrofuran. The THF and mother liquor are combined and stirred with a small amount of a nearly saturated solution of ammonium chloride in water. The organic phase formed is decanted, dried with $MgSO_4$, concentrated and distilled in vacuo to give diphenyl-bis-(3-dimethyl-aminopropyl)-silane, bp 185°C/0.1 mm.

When methyldiphenylchlorosilane, methoxydiphenylchlorosilane or vinyldiphenylchlorosilane is used in place of diphenyl-di-chlorosilane in the above process, methyldiphenyl-(3-dimethylaminopropyl)-silane (bp 185°–198°C/0.1 mm), methoxydiphenyl-(3-dimethylaminopropyl)-silane (bp 166°–170°C./0.1 mm) or vinyldiphenyl-(3-dimethylaminopropyl)-silane (bp 185°–198°C./0.1 mm) respectively, is obtained.

EXAMPLE 2

Triphenyl-(3-dimethylaminopropyl)-silane

The Grignard reagent is prepared as described in Example 1 from 12 g. of magnesium and 48 g. of dimethylaminopropyl chloride in 100 ml. of absolute tetrahydrofuran.

In portions small enough to maintain gentle refluxing, 29.44 g. of solid triphenylchlorosilane is added to the Grignard reagent. After addition is complete, the mixture is refluxed for an additional 1 hour, following which it is stirred at room temperature for 2 days.

About 50 ml. of nearly saturated sodium chloride and 50 ml. of ammonium chloride solution are added to the reactants with cooling and stirring. The organic layer is separated and the aqueous suspension is extracted twice with 1:1 benzene-ether. The combined organic layers are concentrated to a yellow oily product which is distilled to give triphenyl-(3-dimethylaminopropyl)-silane, bp 140°-150°/0.15 mm.

A portion of the crude base (46.8 g.) is dissolved in ether and 2N hydrochloric acid is added with stirring until a pH of 6 is reached. The precipitate is filtered off and washed with ether. It is then suspended in water, filtered and washed with additional water. The product obtained is dimethyl-(3-triphenylsilylpropyl)ammonium chloride, mp 203°-207°C. Additional recrystallization of the salt from 95% ethanol, gives a product with a melting point of 206°-208°C.

EXAMPLE 3

Trimethyl-(3-triphenylsilylpropyl)ammonium iodide

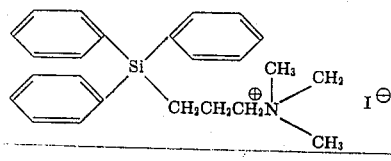

In 25 ml. of methanol, 12.6 g. of triphenyl-(3-dimethyl-aminopropyl)silane is dissolved. The solution is cooled to 0°C. and 5.3 ml. of methyliodide is added. The mixture is stirred for 2 hours at room temperature. The white precipitate which forms is filtered off and washed with a little methanol to yield the product, trimethyl-(3-triphenylsilylpropyl)ammonium iodide, mp 263°-265°C. On recrystallization from methanol, the melting point of the product is 268°-270°C.

When diphenyl-bis-(3-dimethylaminopropyl)silane is used in place of triphenyl-(3-dimethylaminopropyl)silane in the above process, N,N'-hexamethyl(diphenylsilylenedipropyl ammonium)diiodide (m.g. >260°C.) is obtained.

What is claimed is:

1. A pharmaceutical composition in the form of a tablet or capsule comprising a pharmaceutically acceptable inert solid carrier and a hypertension or anxiety-relieving amount of a compound of the formula

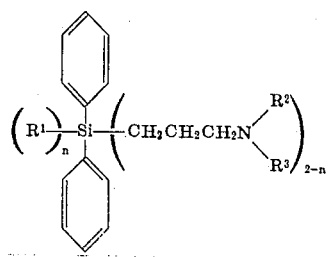

where $n$ is 0 or 1, each $R^1$ represents, independently, alkyl of 1 to 4 carbon atoms, alkoxy of 1 to 4 carbon atoms, alkenyl of 1 to 4 carbon atoms or phenyl; and each $R^2$ and $R^3$ represent, independently, alkyl of 1 to 4 carbon atoms, or a pharmaceutically acceptable lower alkyl quaternary ammonium or acid addition salt of said compound.

2. A composition according to claim 1 in which the quaternary ammonium salt is a lower alkyl quaternary ammonium halide salt.

3. A composition according to claim 1 comprising a carrier and diphenyl-bis-(3-dimethylaminopropyl)silane.

4. A composition according to claim 1 comprising a carrier and methoxydiphenyl-(3-dimethylaminopropyl)silane.

5. A composition according to claim 1 comprising a carrier and vinyldiphenyl-(3-dimethylaminopropyl)silane.

6. A composition according to claim 1 comprising a carrier and triphenyl-(3-dimethylaminopropyl)silane.

7. A composition according to claim 1 comprising a carrier and dimethyl-(3-triphenylsilylpropyl)ammonium chloride.

8. A composition according to claim 1 comprising a carrier and trimethyl-(3-triphenylsilylpropyl)ammonium iodide.

9. A composition according to claim 1 comprising a carrier and N,N'-hexamethyl(diphenylsilylenedipropyl ammonium)diiodide.

10. A composition according to claim 1 which is in unit dose form and contains 20 to 1,500 milligrams of the compound or its pharmaceutically acceptable salt.

11. A composition according to claim 10 which contains 75 to 1,500 milligrams of the compound.

12. A composition according to claim 10 which contains 20 to 750 milligrams of the compound.

13. A method of relieving hypertension or anxiety in an animal which comprises administering to an animal in need of such relief an effective amount of a compound of the formula

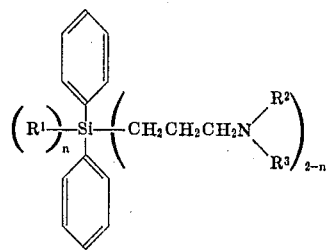

where $n$ is 0 or 1, each $R^1$ represents, independently, alkyl of 1 to 4 carbon atoms, alkoxy of 1 to 4 carbon atoms, alkenyl of 1 to 4 carbon atoms or phenyl; and each $R^2$ and $R^3$ represent, independently, alkyl of 1 to 4 carbon atoms, or a pharmaceutically acceptable lower alkyl quaternary ammonium or acid addition salt of said compound.

14. The method of claim 13 wherein the compound is administered in an amount of from 75 to 3,000 milligrams per day.

15. The method of claim 13 wherein the compound is administered to relieve anxiety.

16. The method of claim 15 wherein the compound is administered in an amount of from 300 to 3,000 milligrams per day.

17. The method of claim 13 wherein the compound is vinyldiphenyl-(3-dimethylaminopropyl)silane.

* * * * *